US012138928B2

(12) United States Patent
Minami et al.

(10) Patent No.: US 12,138,928 B2
(45) Date of Patent: Nov. 12, 2024

(54) METHOD FOR MANUFACTURING LIQUID EJECTION HEAD SUBSTRATE AND METHOD FOR MANUFACTURING LIQUID EJECTION HEAD

(71) Applicant: CANON KABUSHIKI KAISHA, Tokyo (JP)

(72) Inventors: Seiko Minami, Saitama (JP); Hidenori Yamato, Tokyo (JP); Takaaki Yamaguchi, Kanagawa (JP); Nobuyuki Hirayama, Kanagawa (JP); Kyohei Kubota, Oita (JP); Yu Nishimura, Oita (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 273 days.

(21) Appl. No.: 17/886,646

(22) Filed: Aug. 12, 2022

(65) Prior Publication Data

US 2023/0049764 A1 Feb. 16, 2023

(30) Foreign Application Priority Data

Aug. 13, 2021 (JP) ................................ 2021-131994

(51) Int. Cl.
*G03F 7/20* (2006.01)
*B41J 2/16* (2006.01)

(52) U.S. Cl.
CPC ........... *B41J 2/1631* (2013.01); *B41J 2/1601* (2013.01)

(58) Field of Classification Search
CPC ...... B41J 2/1631; B41J 2/1601; B41J 2/1603; B41J 2/1642; B41J 2/14129
See application file for complete search history.

(56) References Cited

U.S. PATENT DOCUMENTS

| | | | |
|---|---|---|---|
| 7,087,983 B2 | 8/2006 | Itano et al. | |
| 7,838,957 B2 | 11/2010 | Itano et al. | |
| 8,183,084 B2 | 5/2012 | Itano et al. | |
| 2004/0126934 A1 | 7/2004 | Itano et al. | |
| 2005/0212096 A1 | 9/2005 | Itano et al. | |
| 2011/0045632 A1 | 2/2011 | Itano et al. | |
| 2014/0293259 A1* | 10/2014 | Manabe .................. | B41J 2/162 355/77 |

FOREIGN PATENT DOCUMENTS

| | | |
|---|---|---|
| JP | 2003-145769 A | 5/2003 |
| JP | 2004-111802 A | 4/2004 |
| JP | 2006-198884 A | 8/2006 |

OTHER PUBLICATIONS

Office Action issued Jul. 4, 2023, in counterpart application JP 2021-131994 (3 pages).

* cited by examiner

*Primary Examiner* — Mesfin T Asfaw
(74) *Attorney, Agent, or Firm* — VENABLE LLP

(57) ABSTRACT

Provided is a method for manufacturing a liquid ejection head substrate and a method for manufacturing a liquid ejection head capable of reducing degradation of the quality of a printed image. To this end, in formation of a liquid ejection head substrate, a part required to have more precise relative positional relation or not required to have high fabrication precision is set as a first part, and for the first part, a single-shot exposure method is employed. Also, a part required to have higher fabrication precision is set as a second part, and for the second part, a split exposure method is employed.

12 Claims, 8 Drawing Sheets

METHOD FOR MANUFACTURING LIQUID EJECTION HEAD SUBSTRATE AND METHOD FOR MANUFACTURING LIQUID EJECTION HEAD

BACKGROUND OF THE INVENTION

Field of the Invention

The present invention relates to a method for manufacturing a liquid ejection head substrate and a method for manufacturing a liquid ejection head.

Description of the Related Art

With the recent trend for faster printing by a liquid ejection head, the nozzles have gotten longer, and heat generation resistance elements, logic circuits, and power supply interconnections have increased in number, increasing the size of chips for the liquid ejection head. In order for such liquid ejection head chips getting larger in size to be as compact as possible, the heat generation elements, logic circuits, power supply interconnections, and the like have become finer in size. To provide such fine elements and interconnections on chips for a liquid ejection head, a semiconductor exposure apparatus is used to reduce a photomask having a fine pattern of electric circuits drawn thereon with a lens and print the pattern onto an element substrate. For these reasons, a high-resolution semiconductor exposure apparatus capable of microfabrication is needed.

However, there is no semiconductor exposure apparatus that achieves a high resolution and a wide field of view at the same time. Thus, in a case where the chip size does not fall within the field of view of the semiconductor exposure apparatus, split exposure technique is used, in which a pattern for a chip is split into a plurality of patterns, and a high-resolution semiconductor exposure apparatus is used to perform exposure, joining the patterns together.

Japanese Patent Laid-Open No. 2004-111802 describes a joint exposure technique which performs exposures joining a plurality of patterns together. More specifically, in the technique described, for an interconnection that does not straddle over a joint position between patterns, split exposure is performed using a reduction projection apparatus supporting microfabrication, and for an interconnection that straddles over a joint position, a single-shot exposure is performed by a reduction projection apparatus having a large exposure area.

In a case of using the method of Japanese Patent Laid-Open No. 2004-111802, on a liquid ejection head substrate where a liquid flow channel and an ejection function film including a plurality of heat generation element portions are formed without straddling over a joint position, the ejection function film and the liquid flow channel are formed by split exposure using a high-resolution semiconductor exposure apparatus. Split exposure enables high-resolution formation, but at the split exposure border, changes the relative relation between the center positions of the liquid flow channel and the ejection function film including the heat generation resistance element portions of heat generation resistance elements. As a result, there is a concern that distortion of the ejection direction may occur, degrading the quality of a printed image.

SUMMARY OF THE INVENTION

Thus, the present invention provides a method for manufacturing a liquid ejection head substrate and a method for manufacturing a liquid ejection head capable of reducing degradation of the quality of a printed image.

To this end, a method for manufacturing a liquid ejection head substrate of the present invention includes: forming a split pattern on a substrate by performing exposure in a split manner through a mask pattern; forming a single-shot pattern on the substrate by performing exposure in a single-shot manner through a mask pattern; and setting a first part and a second part to the substrate, the first part being required to have higher positional precision than the second pattern, the second part being required to have higher fabrication precision than the first part. For the first part, the single-shot pattern is formed by the forming a single-shot pattern, and for the second part, the split pattern is formed by the forming a split pattern.

The present invention can provide a method for manufacturing a liquid ejection head substrate and a method for manufacturing a liquid ejection head capable of reducing degradation of the quality of a printed image.

Further features of the present invention will become apparent from the following description of exemplary embodiments with reference to the attached drawings.

DESCRIPTION OF THE EMBODIMENTS

First Embodiment

A first embodiment of the present invention is described below with reference to the drawings.

Figure 1:
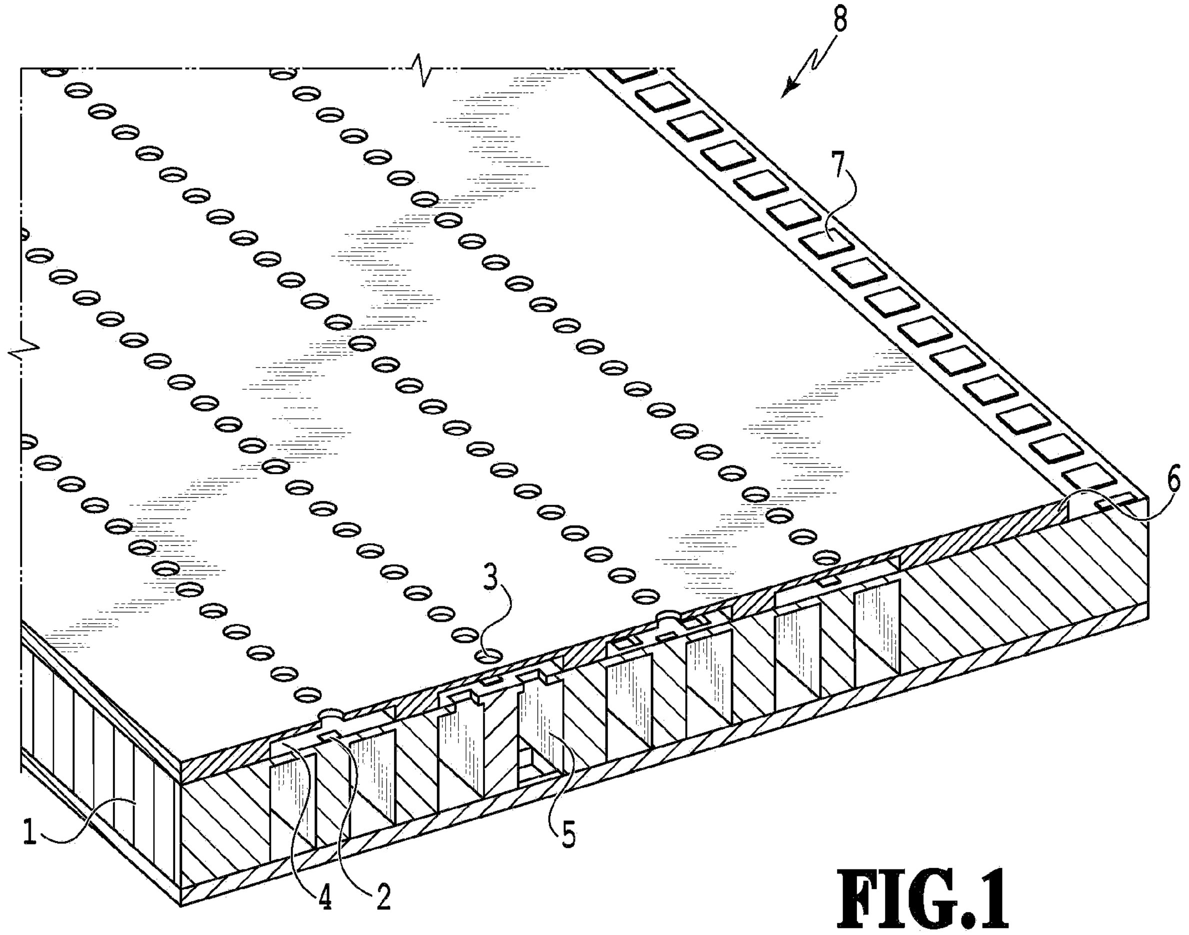
FIG. 1 is a perspective view of a liquid ejection head substrate.

FIG. 1 is a perspective view showing a liquid ejection head substrate 8 of the present embodiment. The liquid ejection head substrate 8 is formed by a stack of a liquid flow channel part 6 and an element substrate 1, the liquid flow channel part 6 having ejection ports 3 formed therein, the element substrate 1 having heat generation resistance elements 2, liquid supply channels 5, and pads 7 formed thereat. Also, bubble formation chambers 4 are formed between the liquid flow channel part 6 and the element substrate 1 stacked on top of each other. The ejection ports 3 are provided at positions facing the heat generation resistance elements 2, and a liquid supplied from the liquid supply channel 5 to the bubble formation chamber 4 is ejected from the ejection ports 3 due to the energy of film boiling caused by the heat generated by the heat generation resistance elements 2.

Figure 2:
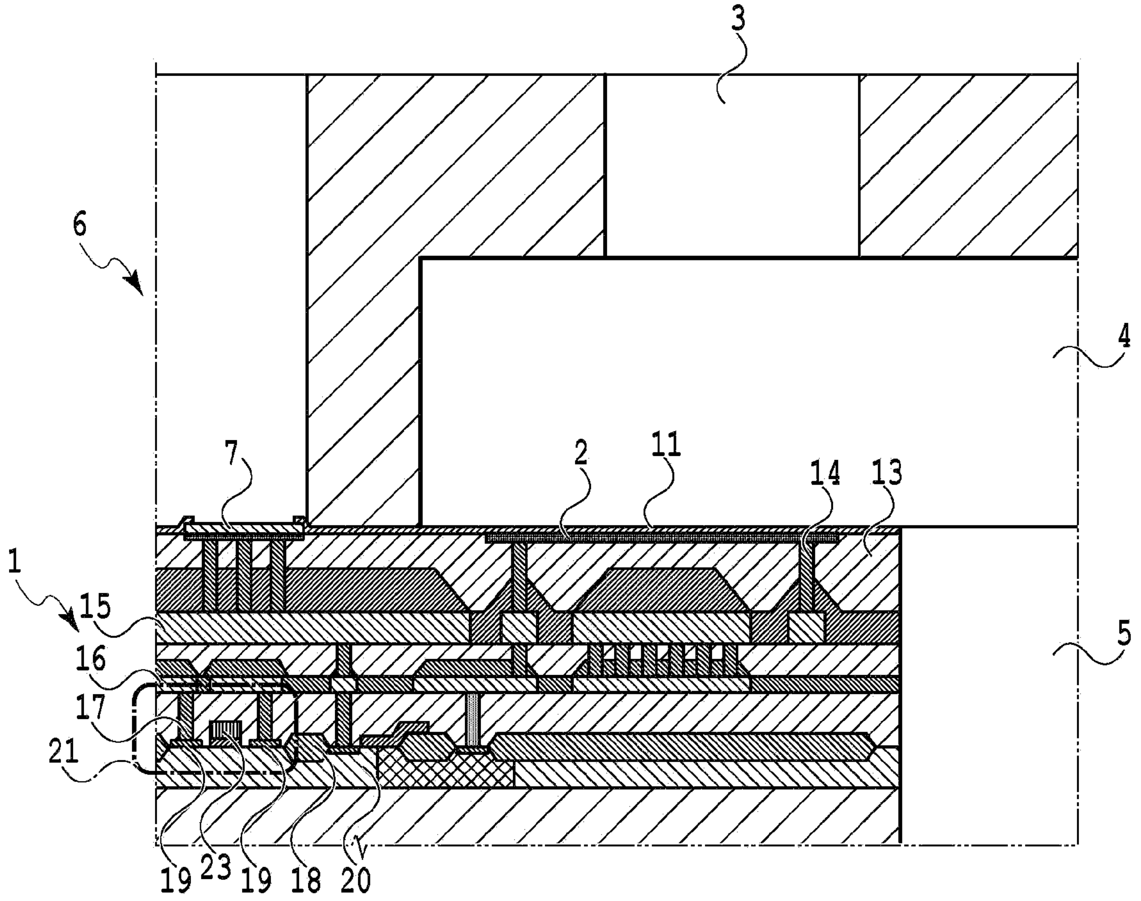
FIG. 2 is a partial sectional view of the liquid ejection head substrate.

FIG. 2 is a partial sectional view of the liquid ejection head substrate 8 of the present embodiment. The element substrate 1 is provided with the heat generation resistance elements 2 and the liquid supply channels 5, and the liquid flow channel part 6 having the ejection ports 3 formed therein is provided on the element substrate 1. The element substrate 1 has a base material formed of Si and an ejection function film formed on the base material, the ejection function film having layers of logic circuits 21, power supply interconnections 15, and the heat generation resistance elements 2. This liquid ejection head substrate 8 is manufactured through a logic circuit formation step, a power supply interconnection formation step, an ejection function film formation step, and a liquid flow channel part formation step.

Figure 3B:
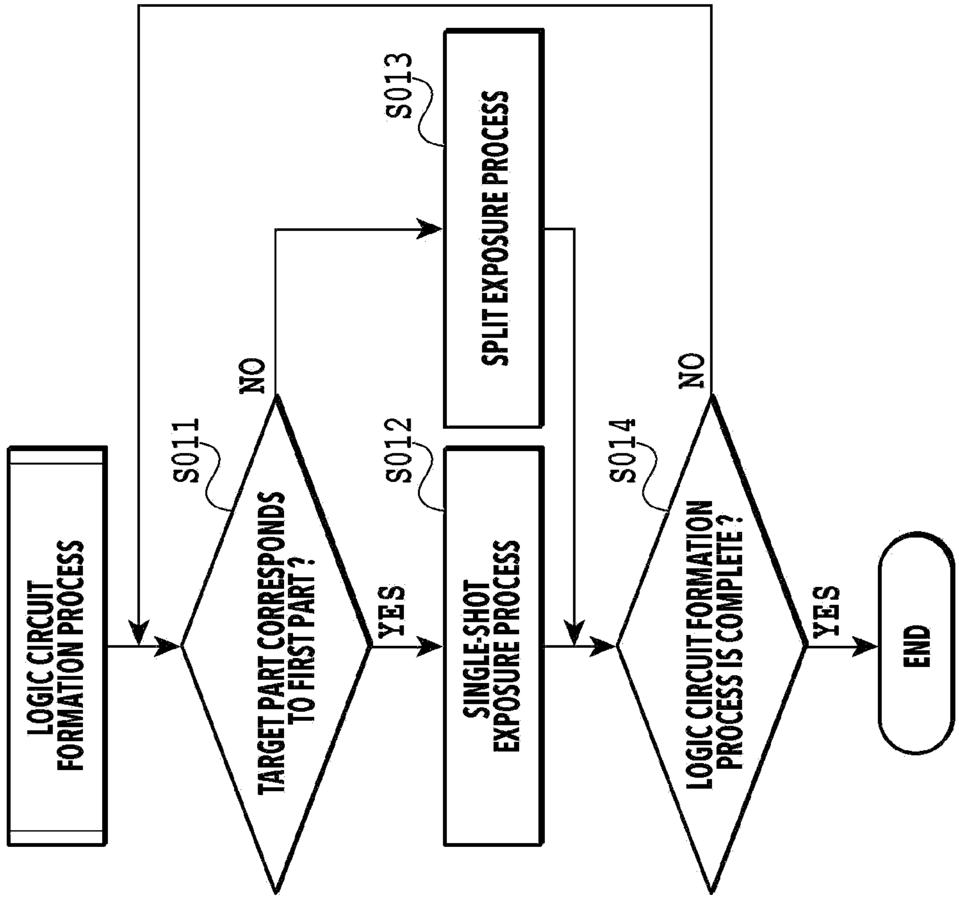
FIG. 3B is a flowchart showing a logic circuit formation process.
Figure 3A:
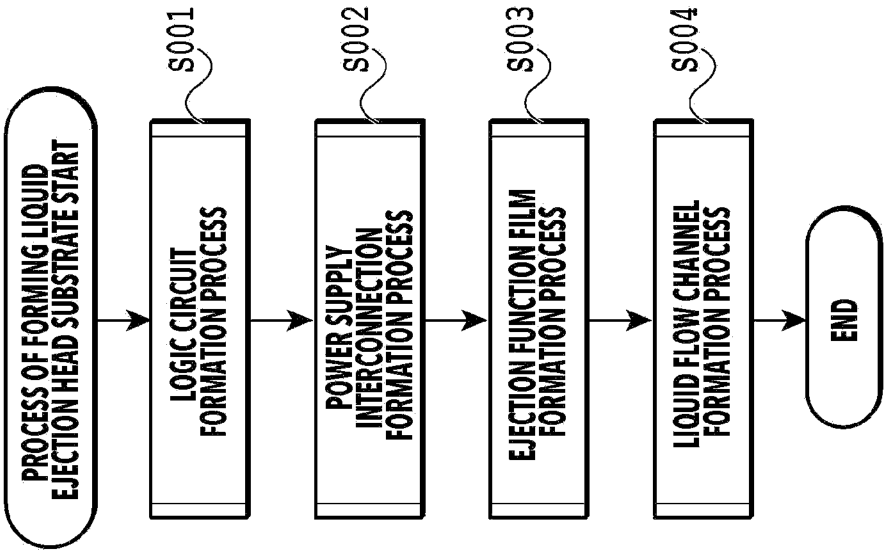
FIG. 3A is a flowchart showing a process of forming the liquid ejection head substrate.
Figure 4A:
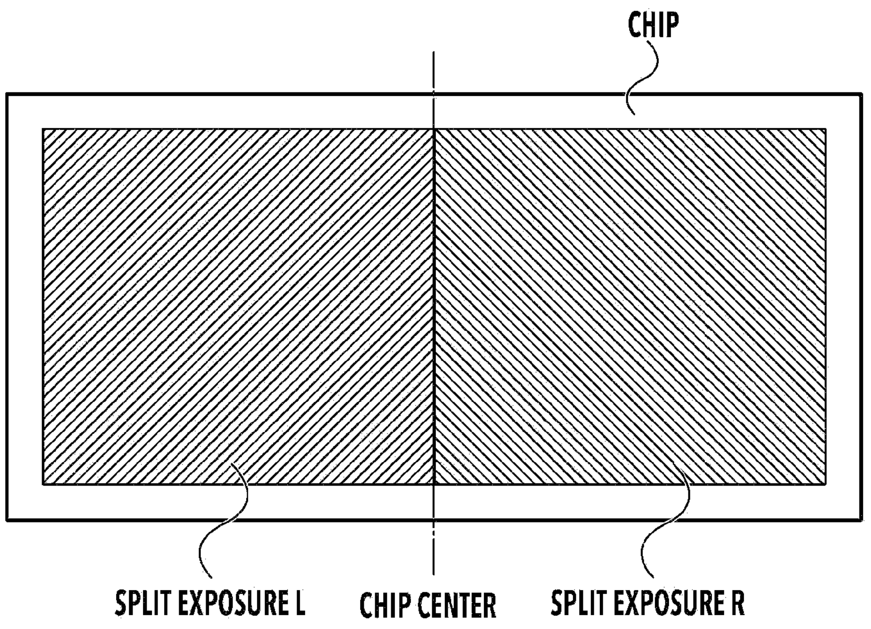
FIG. 4A is a diagram illustrating split exposure.
Figure 4B:
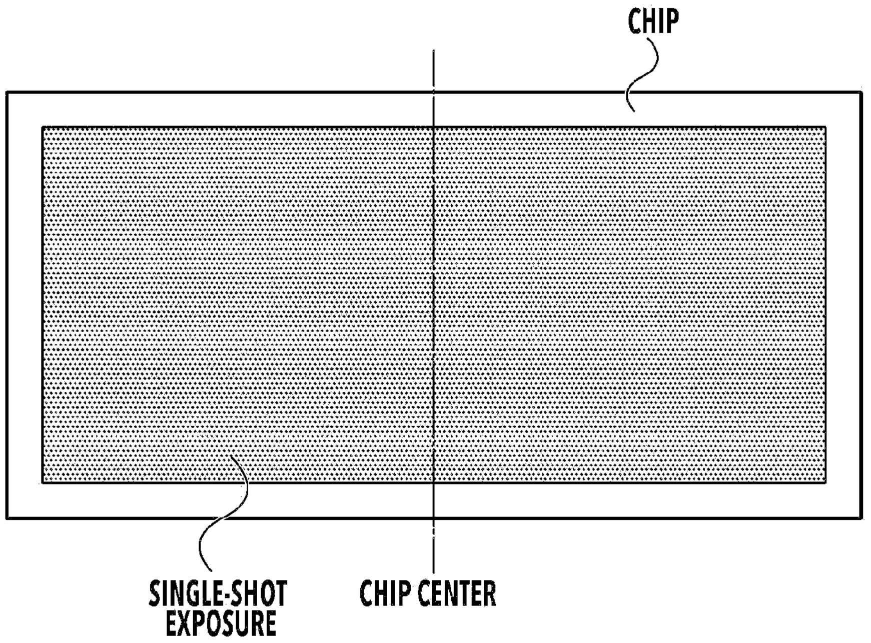
FIG. 4B is a diagram illustrating single-shot exposure.
Figure 5C:
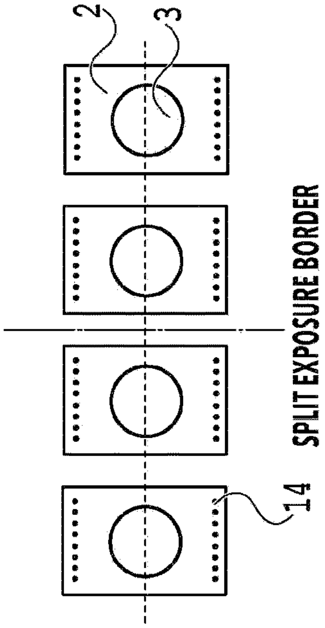
FIG. 5C is an enlarged view of power supply interconnections and a split exposure border area on a chip.
Figure 5D:
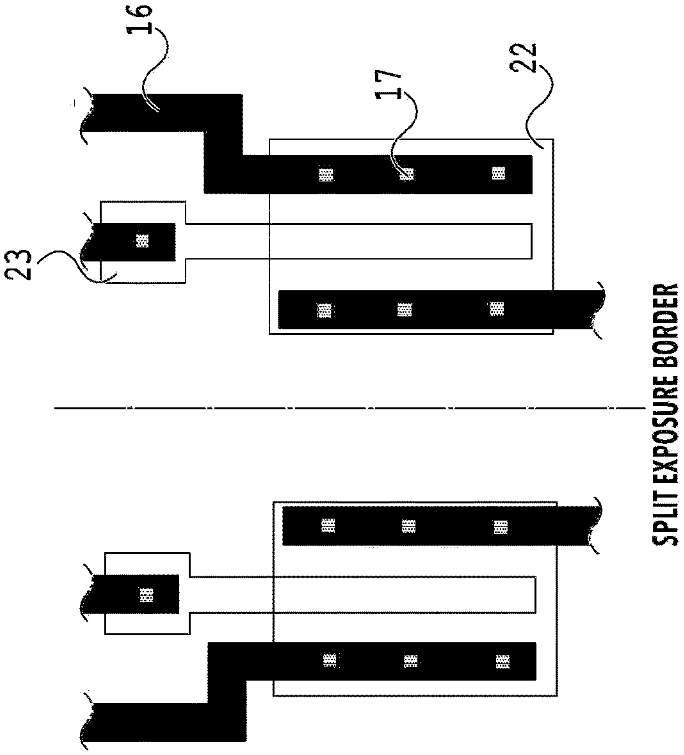
FIG. 5D is an enlarged view of power supply interconnections and a split exposure border area on a chip.
Figure 5A:
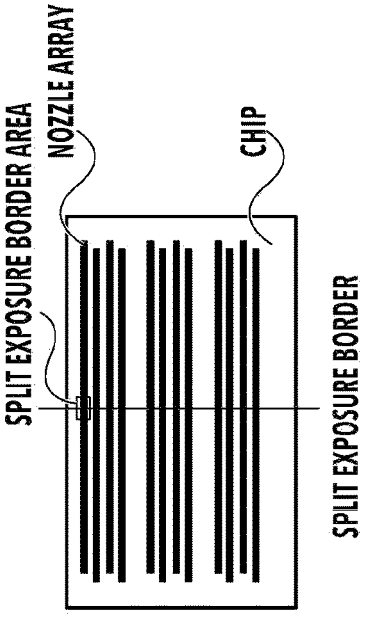
FIG. 5A is an enlarged view of power supply interconnections and a split exposure border area on a chip.
Figure 5B:
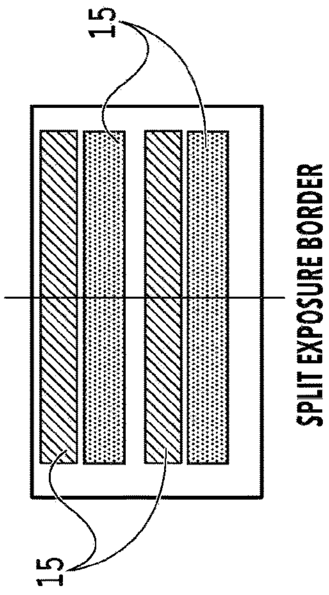
FIG. 5B is an enlarged view of power supply interconnections and a split exposure border area on a chip.

FIG. 3A is a flowchart showing a process of forming the liquid ejection head substrate 8 of the present embodiment, and FIG. 3B is a flowchart showing a sub-routine process of each process in the process of forming the liquid ejection head substrate 8. The sub-routine processes of the respective of processes in the process of forming the liquid ejection head substrate 8 are all the same. FIG. 3B shows an example of a sub-routine process of the logic circuit formation process as an example. FIG. 4A is a diagram illustrating split exposure by a semiconductor exposure apparatus, and FIG. 4B is a diagram illustrating single-shot exposure by a semiconductor exposure apparatus. FIG. 5A is a diagram showing a chip's surface layer, and FIG. 5B is a diagram showing electrically continuous power supply interconnections on a chip. FIGS. 5C and 5D are enlarged view of a split exposure border area including a split exposure border at the chip center part.

In a semiconductor manufacturing process, by light exposure using a semiconductor exposure apparatus, a photomask having an electric circuit pattern drawn thereon is reduced with a lens, and the electric circuit pattern is printed on an element substrate. In the present embodiment, a chip relatively large in size (a large chip) is employed.

Exposure methods by a semiconductor exposure apparatus include a single-shot exposure method and a split exposure method. In the single-shot exposure method, a chip is exposed to light with a single shot. This method offers a low resolution, but has a wide field of view and therefore creates no joint portion in the pattern. Thus, the relative relation between the circuits in the pattern does not change. In the split exposure method, a chip is exposed to light in a split manner. This method offers a high resolution, but creates a joint portion in the pattern. Thus, at the joint portion, it is necessary to provide excess space for the width of interconnections and between the interconnections. Also, the center positions of patterns may be misaligned at the joint portion, which may cause a change in the relative relation between the patterns. Thus, the single-shot exposure method and the split exposure method have their advantages and disadvantages, and it is desirable to use them selectively according to the exposure locations.

Thus, in the present embodiment, each part of a pattern to be printed onto a chip is divided into a part required to have a more precise relative positional relation or not required to have high fabrication precision and a part required to have higher fabrication precision. With a first part being the part required to have a more precise (positionally precise) relative positional relation or not required to have high fabrication precision, the single-shot exposure method is employed for the first part. Then, with a second part being the part required to have higher fabrication precision, the split exposure method is employed for the second part. In the liquid ejection head substrate 8, the part required to have a more precise relative positional relation (the first part) is, for example, a heat generation resistance element portion or the like, and single-shot exposure is performed using a semiconductor exposure apparatus with a wide field of view. Meanwhile, the part required to have higher fabrication precision (the second part) is a logic circuit, a through-hole portion, and the like, and split exposure is performed using a high-resolution exposure apparatus with a small field of view. In this way, to form a substrate, a first part and a second part are set to the substrate, and single-shot exposure and split exposure are selectively used to form a pattern. Steps for manufacturing the liquid ejection head substrate 8 are described below in the order of the steps.

A description is given of the logic circuit formation step (a logic circuit formation process S001 in FIG. 3A), which is the first step. The logic circuit formation step includes a transistor layer formation step, a contact formation step of forming contacts connecting the transistor layer and logic interconnections to each other, and a logic interconnection formation step. The transistor layer formation step includes a well formation step, an element isolation formation step, a gate electrode formation step, a source and drain formation step, and an interlayer isolation film formation step. In forming a logic circuit pattern formed in each of these steps, each part is set either as the first part or the second part, and exposure is carried out by selectively using a semiconductor exposure apparatus with a wide field of view and a high-resolution exposure apparatus.

First, in the transistor layer formation step, a transistor layer is formed. First of all, wells 20 are formed in the element substrate 1. A high-resolution semiconductor exposure apparatus may be used here, but with a large chip, the chip needs to be exposed to light in a split manner, requiring man-hours. Thus, in the step of forming the wells 20, a semiconductor exposure apparatus with a wide field of view is used to form a pattern (a single-shot pattern) with single-shot exposure. The wide field-of-view semiconductor exposure apparatus used here has a field of view of 52 mm×56 mm and is capable of exposing a large chip to light with a single shot. Also, an i-line with an ultraviolet wavelength of 365 nm is used for the light source, and the resolving power is ≤500 nm, providing a resolution high enough for the formation of the wells.

Next, an element isolation 18 is formed in the element isolation formation step (see FIG. 2). In the element isolation formation step, in order for individual transistors to operate independently in a small space, it is necessary to isolate the region of each transistor from the adjacent other transistors, which means a photolithographic process capable of fabrication of a narrow isolation width with high precision is necessary. For this reason, exposure with a high resolving power is needed in the element isolation formation step. Thus, the element isolation portion is regarded as the second part (NO in S011 in FIG. 3B), and a high-resolution semiconductor exposure apparatus is used to form a pattern (a split pattern) using split exposure. The high-resolution semiconductor exposure apparatus used uses an i-line with an ultraviolet wavelength of 365 nm for the light source and has a resolving power of ≤350 nm, providing a resolution high enough for forming the element isolation 18. The semiconductor exposure apparatus used here has a field of view of 26 mm×33 mm, and therefore, in a case of a large chip, the chip needs to be split and exposed to light.

Next, in the gate electrode formation step, gate electrodes 23 are formed (see FIGS. 2 and 5D). The line width of the gate electrode 23 greatly affects variations in the transistor characteristics, and thus fabrication precision is required in this step. The gate electrodes 23 are therefore regarded as the second part (NO in S011 in FIG. 3B) like in the element isolation formation step, and a high-resolution semiconductor exposure apparatus is used to form a pattern with split exposure of the chip.

Next, in the source and drain formation step, sources and drains 19 are formed (see FIG. 2). Although a high-resolution semiconductor exposure apparatus may be used here, high fabrication precision is not required in this step. Thus, the sources and drains 19 are regarded as the first part (YES in S011 in FIG. 3B), and based on the resolution and field of view, a semiconductor exposure apparatus with a wide field of view is used to form a source and drain pattern by performing single-shot exposure of the large chip.

Next, in the interlayer insulation film formation step, an interlayer insulating film is formed. The interlayer insulation film is formed using plasma chemical vapor deposition (CVD). A reactive gas is put into plasma state to generate active radicals and ions, causing them to have a chemical reaction and be deposited on the target substrate, thereby forming a thin interlayer insulation film.

A transistor layer can be formed through the steps thus described.

After that, in the contact formation step, contacts 17 are formed (see FIGS. 2 and 5D). The contacts 17 are used to connect the transistor layer formed and logic interconnections 16 to be formed in a later step. As described in the description of the related art, the logic interconnections are required to be fine in size. For this reason, the contacts 17 to be connected to the logic interconnections 16 need to be fine in size as well. Thus, a pattern for the contacts needs high fabrication precision, and therefore exposure needs to be performed with a high resolving power. The contacts 17 are therefore regarded as the second part (NO in S011 in FIG. 3B), and a high-resolution semiconductor exposure apparatus is used to form the pattern using split exposure. For example, a high-resolution semiconductor exposure apparatus using a KrF excimer laser as its light source can be used. A KrF excimer laser has an emission wavelength of 248 nm and a resolving power of ≤90 nm, providing a resolution high enough for the formation of the contacts. However, because the field of view is 26 mm×33 mm, with a large chip, split exposure is performed on the chip. The interlayer insulation film is etched using the contact mask pattern thus formed, and a contact member is embedded in opening portions. The contacts 17 can thus be formed.

After that, in the logic interconnection formation step, the logic interconnections 16 are formed (see FIGS. 2 and 5D). The logic interconnections 16 include signal interconnections for transmitting signals to transistors and through-holes 14 that connect the signal interconnections to power supply interconnections. As described in the description of the related art, the logic interconnections are required to be fine in size. Thus, a pattern for the signal interconnections and a pattern for the through-holes require high fabrication precision and need the exposure to be of a high resolving power. For this reason, the signal interconnections and the through-holes are regarded as the second part (NO in S011 in FIG. 3B), and a high-resolution semiconductor exposure apparatus is used to form a pattern (a logic interconnection pattern) by performing split exposure. For example, a high-resolution semiconductor exposure apparatus using a KrF excimer laser as its light source can be used here.

Etching is performed using the signal interconnection pattern, and the signal interconnections are thereby formed. An interlayer insulation layer is formed on the signal interconnections. The interlayer insulation layer can be formed using plasma CVD. Next, the interlayer insulating film is etched using the through-hole mask pattern, and the through-holes 14 are formed by embedding a through-hole member in opening portions (see FIGS. 2 and 5C). By repeating the same steps, the signal interconnection layer can have a multilayer structure.

In this way, the transistor layer, the contacts, and the logic interconnections are formed in the logic circuit formation step, which is the first step.

A description is now given of the power supply interconnection formation step (a power supply interconnection formation process S002 in FIG. 3A), which is the second step. As described in the description of the related art, the power supply interconnections 15 have been required to be fine in size in recent years. A change in the relative relation of the power supply interconnections 15 to the center positions of the liquid flow channel part and the ejection function film including the heat generation resistance elements does not have much influence. Meanwhile, the formation of the power supply interconnections 15 needs high fabrication precision and exposure with a high resolving power. Thus, the power supply interconnections 15 are regarded as the second part (NO in S011 in FIG. 3B), and a high-resolution semiconductor exposure apparatus is used to perform split exposure. For example, a high-resolution semiconductor exposure apparatus having a KrF excimer laser as its light source can be used. Etching is performed using a power supply interconnection mask pattern thus formed, thereby forming the power supply interconnections (see FIG. 5B).

A description is now given of the ejection function film formation step (an ejection function film formation process S003 in FIG. 3A), which is the third step. The ejection function film formation step includes a heat generation resistance element formation step, an adhesion layer formation step, and a protective film formation step.

First, a heat storage layer 13 is formed. A SiO film is used as the heat storage layer 13. Next, through-hole portions for the heat generation resistance elements 2 are formed. Via the through-holes 14, a current is passed from the power supply interconnections 15 to the heat generation resistance elements 2 in the ejection function film. The virtual size of the heat generation resistance elements 2 contributing to bubble formation in the current direction is determined by the distance between the through-holes. Thus, variations in through-hole diameters result in variations in the virtual size of the heat generation resistance elements 2 contributing to bubble formation, consequently causing variations in bubble formation. Thus, for the formation of the through-hole portions for the heat generation resistance elements 2, the through-holes 14 are regarded as the second part (NO in S011 in FIG. 3B), and a high-resolution semiconductor exposure apparatus is used to perform split exposure. A mask pattern for the through-holes for the heat generation resistance elements 2 is thus formed by split exposure of the chip using a high-resolution semiconductor exposure apparatus. The heat storage layer 13 is etched using the through-hole pattern thus formed, and a through-hole member is embedded in opening portions, thereby forming the through-holes 14 for the heat generation resistance elements 2.

For the formation of the ejection function film and the liquid flow channel part to be described later in the fourth step, it is necessary to have a high resolution and to have a precise relative relation between the center positions of the heat generation resistance elements 2 and the liquid flow channel part. In a case where a mask pattern for heat generation resistance element portions is formed by split exposure, the relative relation between the center positions of the ejection function film and the liquid flow channel part changes at the split exposure border. As a result, distortion of the ejection direction may be occur. For this reason, in the present embodiment, the heat generation resistance elements 2 are regarded as the first part (YES in S011 in FIG. 3B), and in the ejection function film formation step, a heat generation resistance element pattern is formed by single-shot exposure of the chip. It is therefore preferable to use a semiconductor exposure apparatus with a wide field of view. The wide field-of-view semiconductor exposure apparatus used here has a field of view of 52 mm×56 mm and is capable of exposing a large chip to light with a single shot. This semiconductor exposure apparatus uses an i-line with an ultraviolet wavelength of 365 nm as its light source and has a resolving power of ≤500 nm, providing a resolution high enough for the formation of a mask pattern for forming the heat generation resistance element portions and other portions of the ejection function film.

Also, depending on the product, a mask pattern for the heat generation resistance element portions and other portions of the ejection function film can be formed by single-shot exposure of the wafer surface. By preparing exposure data taking distortion of the wafer surface into consideration, the distortion of the wafer surface can be corrected. Under the heat generation resistance elements 2, the heat storage layer 13 with heat retention and insulation properties is provided. On top of the heat generation resistance elements 2, a protective film 11 with passivation, insulation, and ink-resistance properties is provided. These films can be formed by sputtering or plasma CVD. A liquid ejection head substrate can be manufactured in this way.

The pattern for the through-hole portions for the heat generation resistance elements 2 in the liquid ejection head substrate 8 thus formed has less variations in the through-hole diameters because of the split exposure. Also, as shown in FIG. 5C, through-holes for the same heat generation resistance element are not located across the split exposure border, and therefore the distance between the through-holes in the same heat generation resistance element portion is constant. In other words, variations in the virtual size of the heat generation resistance elements 2 contributing to bubble formation can be reduced, which means less variations in bubble formation.

Also, because the heat generation resistance element portions are formed by single-shot exposure of the chip, the relative relation between the center positions of the liquid flow channel part and the ejection function film including the heat generation resistance elements 2 does not change even with the split exposure border being located in between as shown in FIG. 5C.

A description is now given of the liquid flow channel formation step (a liquid flow channel formation process S004 in FIG. 3A), which is the fourth step. In the liquid flow channel formation step, liquid flow channels are formed in the liquid ejection head substrate 8 manufactured through the first to third steps. The liquid flow channel formation step includes a liquid supply channel formation step, a bubble formation chamber formation step, and an ejection port formation step.

For patterns formed in the steps in the liquid flow channel formation step, positions relative to the heat generation resistance elements are important. For example, for the formation of the ejection ports, it is necessary to have a high resolution and have a precise relative relation between the center positions of each heat generation resistance element and its corresponding ejection port. In a case where split exposure is performed to form the ejection ports, the relative relation between the center positions of the ejection ports and the ejection function film including the heat generation resistance elements changes at the split exposure border. As a result, distortion of the ejection direction may occur. Thus, the ejection ports are regarded as the first part (YES in S011 in FIG. 3B), and in the liquid supply channel formation step, an ejection port pattern is preferably formed by single-shot exposure of the chip as a liquid supply channel pattern. The same applies to the bubble formation chambers, and a bubble formation chamber pattern is formed by single-shot exposure. A misalignment of the relative positions between the liquid supply channel and the heat generation resistance elements 2 has a great influence on the liquid supply amount. Thus, it is preferable to use a semiconductor exposure apparatus with a wide field of view. The wide field-of-view semiconductor exposure apparatus used here has a field of view of 52 mm×56 mm and is capable of single-shot exposure of a large chip. This semiconductor exposure apparatus uses an i-line with an ultraviolet wavelength of 365 nm as its light source and has a resolving power of ≤500 nm, providing a resolution high enough for formation of a mask pattern for forming the liquid flow channel part. Depending on the product, a mask pattern for the liquid flow channel part can be formed by single-shot exposure of the wafer surface.

The liquid flow channels are formed using the mask pattern thus formed. Specifically, liquid supply channels for feeding a liquid from the surface of the substrate to each ejection port are formed. Next, a layer to be flow channels and bubble formation chambers is tented on the substrate. Photoresist is used as a tenting material. Further, a layer remaining as the liquid flow channel part is tented. Patterning is performed in the order of a lower layer and an upper layer, thereby forming the flow channels, the bubble formation chambers, and the ejection ports. A liquid ejection head can thus be manufactured.

By thus performing single-shot exposure to reduce misalignment of the liquid flow channels, clearance provided to prevent interference between the substrate circuit portion and the opening portions of the liquid flow channels can be reduced. This allows reduction of chip size and also increases liquid supply speed. Also, by preparing exposure data with distortion of the wafer surface taken into consideration, the distortion of the wafer surface can be corrected.

Liquid flow channels in a liquid ejection head formed by the above method are formed without changing their relative relation to the center position of the ejection function film including the heat generation resistance elements, as shown in FIG. 5C. Thus, a liquid ejection head less likely to have distortion of the ejection direction can be provided.

In this way, in the formation of the liquid ejection head substrate 8, the single-shot exposure method is employed for the first part, which is a part required to have a more precise relative positional relation or not required to have high fabrication precision, and the split exposure method is employed for the second part, which is a part required to have higher fabrication precision. Thus, a method for manufacturing a liquid ejection head substrate and a method for manufacturing a liquid ejection head capable of reducing degradation of the quality of a printed image can be provided.

Second Embodiment

A second embodiment of the present invention is described below with reference to the drawings. Since the basic configuration of the present embodiment is the same as that of the first embodiment, the following only describes characteristic configurations.

Figure 6:
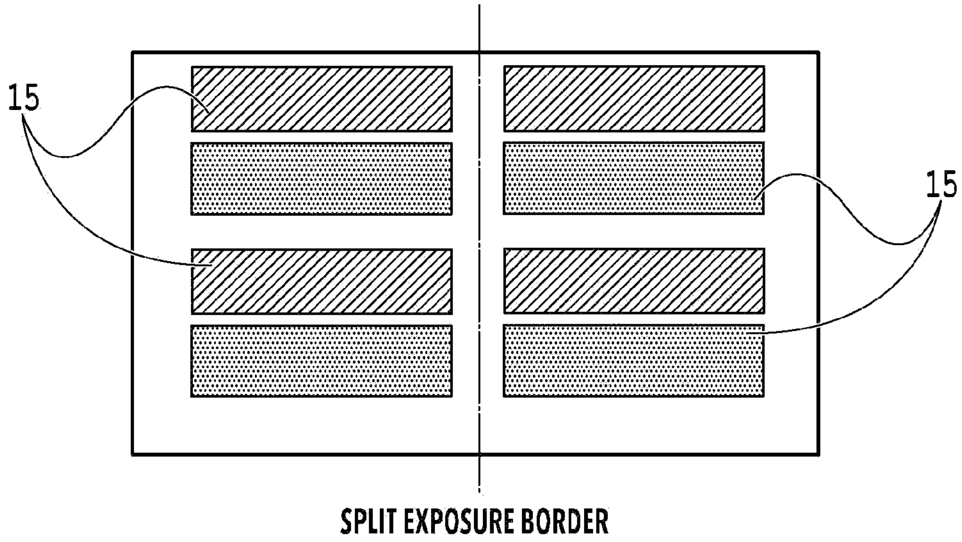
FIG. 6 is a diagram showing electrically separated power supply interconnections on a chip.
Figure 7:
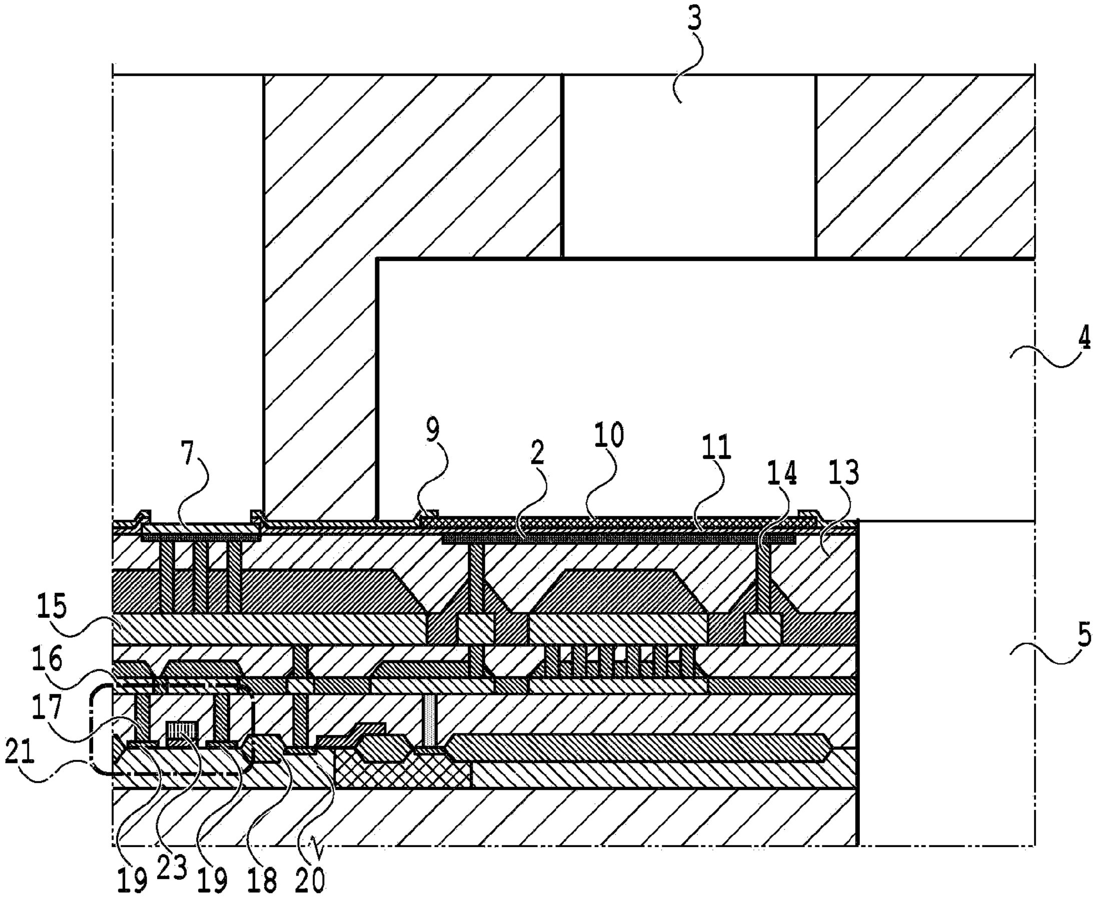
FIG. 7 is a partial sectional view of a liquid ejection head substrate.

FIG. 6 is a diagram showing the electrically separated power supply interconnections 15 on a chip in the present embodiment, and FIG. 7 is a partial sectional view of the liquid ejection head substrate 8 of the present embodiment. In the present embodiment, in the power supply interconnection formation step (the power supply interconnection formation process S002 in FIG. 3A), which is the second step, the power supply interconnections are electrically separated. Specifically, by thus separating the power supply interconnections at the center part of the chip, load on the circuits can be evened. Further, design simplification can be achieved by the line-symmetric separation of the supply interconnections.

Also, in the ejection function film formation step (the ejection function film formation process S003 in FIG. 3A), which is the third step, an anti-cavitation film 10 is formed after the formation of the protective film. Ta is used as a material of the anti-cavitation film. A mask pattern used for the formation of the anti-cavitation film 10 is formed by single-shot exposure using a semiconductor exposure apparatus with a wide field of view. Then, etching is performed using the mask pattern thus formed, thereby forming the anti-cavitation film 10.

The liquid ejection head thus manufactured by the above manufacturing method has a continuous distribution of a misalignment of the relative positions between the ejection function film and the liquid flow channel part. Thus, a liquid ejection head less likely to have distortion of the ejection direction can be provided. Also, the separation of the power supply interconnections 15 allows usage of high power. The anti-cavitation film 10 can reduce cavitation impact and damage from ink to the heat generation resistance elements 2. Further, the adhesion layer can reduce peeling of the substrate and the liquid flow channel part. Consequently, a liquid ejection head reliable over a long period of time can be provided.

Third Embodiment

A third embodiment of the present invention is described below with reference to the drawings. Since the basic configuration of the present embodiment is the same as that of the first embodiment, the following only describes characteristic configurations.

Figure 8:
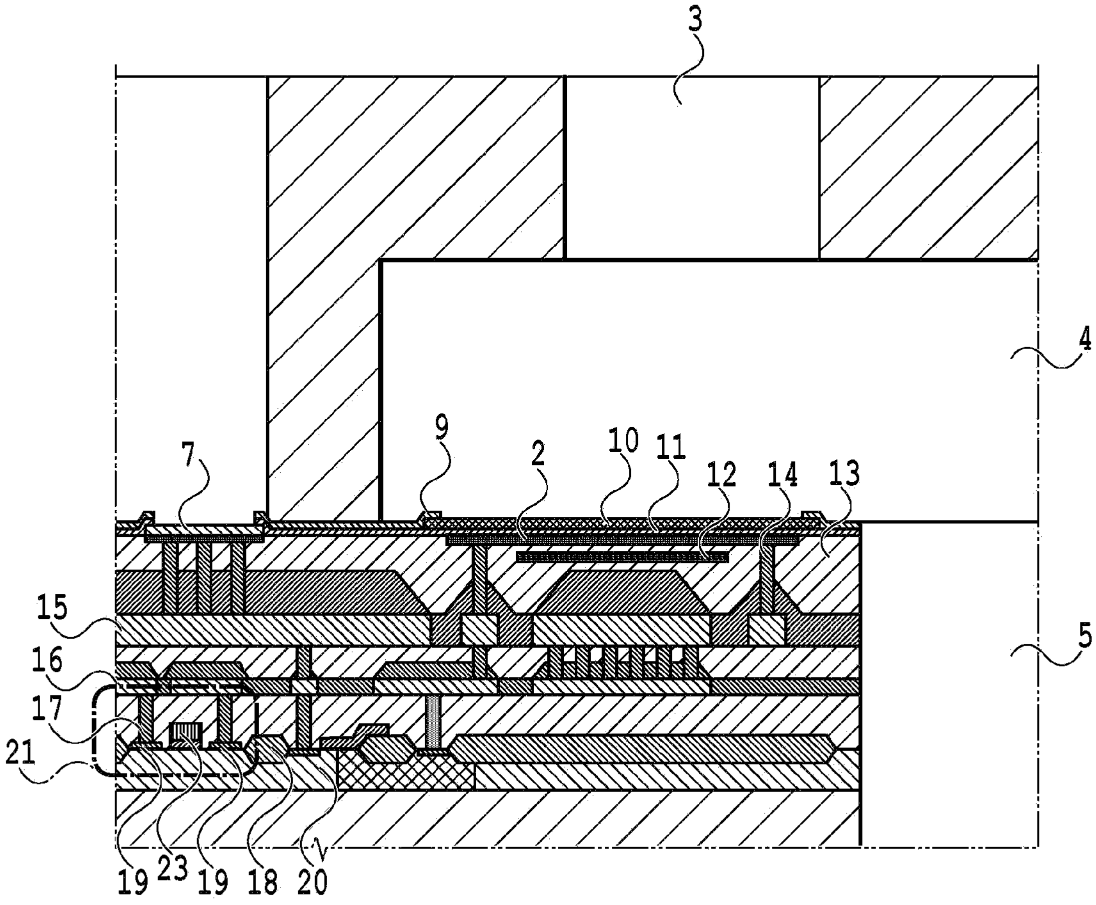
FIG. 8 is a partial sectional view of a liquid ejection head substrate.

FIG. 8 is a partial sectional view of the liquid ejection head substrate 8 of the present embodiment. In the present embodiment, in the ejection function film formation step (the ejection function film formation process S003 in FIG. 3A), which is the third step, an ejection detection sensor film 12 is provided as an underlayer of the heat generation resistance elements 2. The manufacturing process is the same as the step for the heat generation resistance elements 2 described in the first embodiment. The ejection detection sensor film 12 is formed by forming a mask pattern for the ejection detection sensor film portion and performing etching to form the ejection detection sensor film 12. TaSiN is used as a material for the ejection detection sensor film 12.

The liquid ejection head thus manufactured by the above manufacturing method has a continuous distribution of a misalignment of the relative positions between the ejection function film and the liquid flow channel part. Thus, a liquid ejection head less likely to have distortion of the ejection direction can be provided. Also, with the ejection detection sensor film 12, an ejection status such as the position and amount of liquid on the ejection detection film can be detected. Consequently, a liquid ejection head highly reliable in terms of print quality can be provided.

Comparative Example

As a comparative example, a mask pattern used for an ejection function film including heat generation resistance element portions and a mask pattern used for the liquid flow channel part including ejection ports are formed using split exposure. At the split exposure border, the liquid ejection head thus manufactured by the above manufacturing method has a discontinuous distribution of a misalignment of the relative positions between the liquid flow channel part and the ejection function film including heat generation resistance element portions of the heat generation resistance elements 2. As a result, the ejection direction of the liquid ejected from the liquid ejection head is distorted.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-131994, filed Aug. 13, 2021, which is hereby incorporated by reference wherein in its entirety.

What is claimed is:

1. A method for manufacturing a liquid ejection head substrate, the method comprising:
- forming a split pattern on a substrate by performing exposure in a split manner through a mask pattern;
- forming a single-shot pattern on the substrate by performing exposure in a single-shot manner through a mask pattern; and
- setting a first part and a second part to the substrate, the first part being required to have higher positional precision than the second pattern, the second part being required to have higher fabrication precision than the first part, wherein
- for the first part, the single-shot pattern is formed by the forming a single-shot pattern, and
- for the second part, the split pattern is formed by the forming a split pattern.

2. The method for manufacturing a liquid ejection head substrate according to claim 1, further comprising forming a logic circuit on the substrate, wherein
- in the forming a logic circuit, a transistor layer, a logic interconnection, and a contact for connecting the transistor layer to the logic interconnection are formed.

3. The method for manufacturing a liquid ejection head substrate according to claim 2, wherein
- in the formation of the logic interconnection, the logic interconnection is set as the second part, and a logic interconnection pattern is formed by the forming a split pattern.

4. The method for manufacturing a liquid ejection head substrate according to claim 2, wherein in the formation of the contact, the contact is set as the second part, and a contact pattern is formed by the forming a split pattern.

5. The method for manufacturing a liquid ejection head substrate according to claim 1, further comprising forming a power supply interconnection on the substrate, wherein in the forming a power supply interconnection, the power supply interconnection is set as the second part, and a power supply interconnection mask pattern is formed by the forming a split pattern.

6. The method for manufacturing a liquid ejection head substrate according to claim 1, further comprising forming an ejection function film on the substrate, wherein in the forming an ejection function film, a heat generation resistance element that generates heat as energy for liquid ejection and a through-hole for passing a current to the heat generation resistance element are formed.

7. The method for manufacturing a liquid ejection head substrate according to claim 6, wherein in the formation of the heat generation resistance element, the heat generation resistance element is set as the first part, and a heat generation resistance element pattern is formed by the forming a single-shot pattern, and the through-hole is set as the second part, and a through-hole pattern is formed by the forming a split pattern.

8. The method for manufacturing a liquid ejection head substrate according to claim 1, further comprising forming a liquid flow channel in the substrate, wherein in the forming a liquid flow channel, a liquid supply channel, a bubble formation chamber, and an ejection port are formed.

9. The method for manufacturing a liquid ejection head substrate according to claim 8, wherein in the formation of the liquid supply channel, the liquid supply channel is set as the first part, and a liquid supply channel pattern is formed by the forming a single-shot pattern.

10. The method for manufacturing a liquid ejection head substrate according to claim 8, wherein in the formation of the bubble formation chamber, the bubble formation chamber is set as the first part, and a bubble formation chamber pattern is formed by the forming a single-shot pattern.

11. The method for manufacturing a liquid ejection head substrate according to claim 8, wherein in the formation of the ejection port, the ejection port is set as the first part, and an ejection port pattern is formed by the forming a single-shot pattern.

12. A method for manufacturing a liquid ejection head, comprising:

forming a split pattern on a substrate by performing exposure in a split manner through a mask pattern;

forming a single-shot pattern on the substrate by performing exposure in a single-shot manner through a mask pattern; and setting a first part and a second part to the substrate, the first part being required to have higher positional precision than the second pattern, the second part being required to have higher fabrication precision than the first part, wherein for the first part, the single-shot pattern is formed by the forming a single-shot pattern, and for the second part, the split pattern is formed by the forming a split pattern.

* * * * *